Aug. 27, 1929.　　　J. R. MAHAN　　　1,726,187
VALVE SEAT PULLER
Filed March 12, 1928
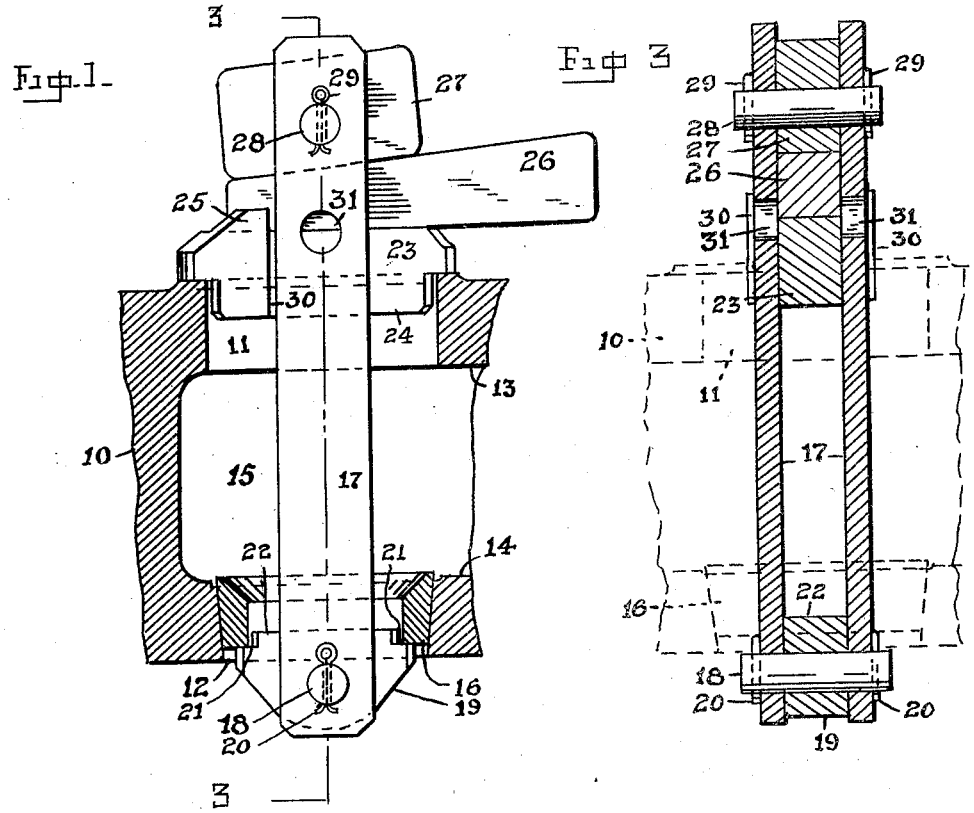
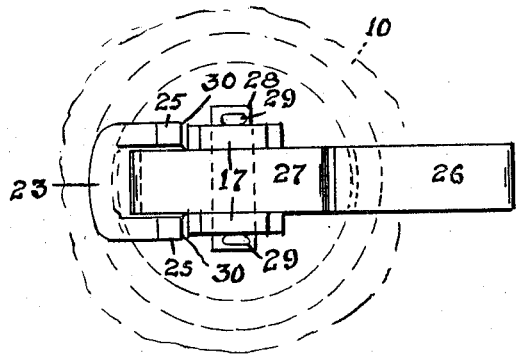
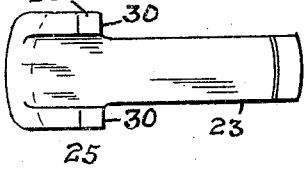
INVENTOR.
J. R. Mahan
BY
F. N. Barber
ATTORNEY.

Patented Aug. 27, 1929.

1,726,187

UNITED STATES PATENT OFFICE.

JOSEPH R. MAHAN, OF TOLEDO, OHIO, ASSIGNOR TO THE NATIONAL SUPPLY COMPANY, OF TOLEDO, OHIO, A CORPORATION OF OHIO.

VALVE-SEAT PULLER.

Application filed March 12, 1928. Serial No. 261,058.

My invention relates to devices for pulling valve seats from their casings or housings.

It is one object of this invention to provide a valve seat puller which is simple in construction and cheap to manufacture and efficient in operation. Valve pullers which employ nuts on threaded shanks to pull valve seats from their casings do not possess the required strength to give satisfactory service, particularly in cases where great force is required to start the valve seats.

Referring to the accompanying drawing, Fig. 1 is a side elevation of my valve seat puller in operative position in a valve casing shown together with its valve seat in section; Fig. 2, a plan view of Fig. 1; Fig. 3, a section on the line 3—3 on Fig. 1; and Fig. 4, a plan view of the wedge support or rest.

On the drawing, 10 designates a valve casing having the axially alined openings 11 and 12 in its opposing walls 13 and 14 separated by the space 15 which normally would contain a valve, not shown, adapted to the valve seat 16.

I provide a shank which comprises a pair of parallel bars or tension members 17 which are somewhat longer than the distance between the exterior faces of the walls 13 and 14. A pin 18 extends through the lower ends of the bars 17 and through the cross-head or block 19, there being cotter pins 20 passed through the pins at the outer faces of the bars to retain the pin in place and to hold the bars and the cross-head in assembled positions and preferably closely together. The cross-head is rotatable on the pin 18 and has end portions or shoulders 21 which may simultaneously engage diametrically opposite portions on the bottom of the valve seat 16, as shown in Fig. 1. The cross-head has preferably a projection 22 which extends up into the valve seat to center the cross-head with respect to the valve seat when the shoulders 21 are engaged with the bottom of the valve seat. The cross-head is of such a width at right engles to a plane connecting the shoulders 21 as to permit it to pass through the valve seat when the cross-head is rotated ninety degrees from the position shown in Fig. 1.

23 is the wedge support having its ends seated on the outer face of the wall 13 adjacent to the opening 11. The support 23 has a central projection 24 which projects into the opening 11 to center the support when the latter rests on its seat, the wall 13, as shown. This wedge support lies between the bars 17. The upper face of the support has at one end a pair of upstanding lugs 25 between which the smaller end of the wedge 26 slides. The wedge is slidable on the outer face of the support 23 and between the bars 17. The edge of the wedge opposite that which rides on the support 23 bears against the inner face of the block or abutment 27 pivoted on the pin 28 in the bars 17. The pin 28 is held in place by the cotter pins 29 which pass through them at the outer faces of the bars 17. That end of the support 23 on which the smaller end of the wedge rides has the lateral shoulders 30 which serve as abutments or stops for the edges of the bars 17 when the wedge is being driven between the support 23 and the block 27 by a heavy sledge or similar tool.

The valve having been removed so that the casing 10 is empty as shown, the bars 17 with the cross-head 19 properly turned on the pin 18 are passed through the opening 11 and the valve seat 16. The cross-head is then turned to the position shown in Fig. 1 with its shoulders 21 against the bottom of the valve seat. The wedge support is put into the position shown and the wedge 26 is finally positioned as shown and driven by a suitable tool towards its smaller end, causing the valve seat to be pulled from the opening 12. It is obvious that the parts of the puller may be assembled and applied to the valve casing in various ways. The cross-head or the block 27 or both could be assembled with the bars after the bars are in the opening 11 and the valve seat.

The bars 17 may be provided with additional holes 31 for the pin 28, so that the puller may be readily adapted to casing 10 whose walls 13 and 14 are a less distance apart. The same result may be secured by providing additional supports 23 or blocks 27 or both of greater width. Wedges of different widths may be provided for the same purpose. Adjustment may also be secured by inverting the block 27 which has the hole for pin 28 at one side of the center thereof.

However, the provision of a pivot for the block 27 is important whether or not it is eccentrically positioned in the block, so that wedges having different inclinations may be used without producing stresses on the pin in such a direction as not to produce a central longitudinal pull on the shank. With a pivoted abutment it is self-alining with wedges of various inclinations.

I claim:—

1. In a valve seat puller a shank, a cross-head carried by one end thereof, a wedge movable transversely of the shank, a pivotal abutment carried by the remaining end of the shank and guiding the outer edge of the wedge, and a wedge support on which the opposite edge of the wedge moves.

2. In a valve seat puller a shank, a cross-head carried by one end thereof, a wedge movable transversely of the shank, an abutment carried by the remaining end of the shank and guiding the outer edge of the wedge, and a wedge support on which the opposite edge of the wedge moves, there being provision whereby the abutment may be adjusted along the shank.

3. In a valve seat puller a shank, a cross-head carried by one end thereof, a wedge movable transversely of the shank, a pivotal abutment carried by the remaining end of the shank and guiding the outer edge of the wedge, and a wedge support on which the opposite edge of the wedge moves, the pivot for the abutment being at one side of the center thereof.

4. In a valve seat puller a shank, a cross-head carried by one end thereof, a wedge movable transversely of the shank, an abutment carried by the remaining end of the shank and guiding the outer edge of the wedge, and a wedge support on which the opposite edge of the wedge moves, the shank being provided with holes arranged longitudinally thereof, through which holes retaining means may be passed for adjusting the abutment along the shank.

5. In a valve seat puller, a pair of opposed tension bars, a cross-head pivoted between one pair of the opposing ends of the bars, an abutment pivoted between the other pair of the opposing ends of the bars, a wedge support adapted to be placed between the tension bars and between the cross-head and the abutment, and a wedge adapted for insertion between the abutment and the wedge support.

6. In a valve seat puller, a pair of opposed tension bars, a cross-head pivoted between one pair of the opposing ends of the bars, an abutment pivoted between the other pair of the opposing ends of the bars, a wedge support adapted to be placed between the tension bars and between the cross-head and the abutment, and a wedge adapted for insertion between the abutment and the wedge support, the bars having provision whereby the abutment may be adjusted along the bars.

7. In a valve seat puller, a pair of opposed tension bars, a cross-head pivoted between one pair of the opposing ends of the bars, an abutment pivoted between the other pair of the opposing ends of the bars, a wedge support adapted to be placed between the tension bars and between the cross-head and the abutment, and a wedge adapted for insertion between the abutment and the wedge support, the pivot bearing in the abutment being at one side of its center.

In testimony whereof I hereunto affix my signature.

JOSEPH R. MAHAN.